US012746891B2

(12) United States Patent
Maier et al.

(10) Patent No.: US 12,746,891 B2
(45) Date of Patent: Sep. 29, 2026

(54) METHOD FOR OPERATING A WIPER, COMPUTING UNIT AND VEHICLE

(71) Applicant: Robert Bosch GmbH, Stuttgart (DE)

(72) Inventors: Gerald Maier, Ottersweier-Unzhurst (DE); Robert-Jan van de Rovaart, Ottersweier (DE)

(73) Assignee: Robert Bosch GmbH, Stuttgart (DE)

( * ) Notice: Subject to any disclaimer, the term of this patent is extended or adjusted under 35 U.S.C. 154(b) by 190 days.

(21) Appl. No.: 18/619,368

(22) Filed: Mar. 28, 2024

(65) Prior Publication Data

US 2024/0326746 A1 Oct. 3, 2024

(30) Foreign Application Priority Data

Mar. 31, 2023 (DE) ............................ 102023202996

(51) Int. Cl.
*B60S 1/08* (2006.01)

(52) U.S. Cl.
CPC .................................. *B60S 1/0848* (2013.01)

(58) Field of Classification Search
None
See application file for complete search history.

(56) References Cited

U.S. PATENT DOCUMENTS

| | | | | |
|---|---|---|---|---|
| 10,173,646 | B1 * | 1/2019 | Rice | B60S 1/485 |
| 11,794,750 | B1 * | 10/2023 | Roy | B60W 40/068 |
| 2015/0082574 | A1 * | 3/2015 | Shibusawa | B60S 1/482 15/250.02 |
| 2020/0142187 | A1 * | 5/2020 | Hu | H04N 23/61 |
| 2023/0242080 | A1 * | 8/2023 | Krishnan | G01S 7/4043 701/36 |
| 2024/0279933 | A1 * | 8/2024 | Kume | E04D 13/0765 |

FOREIGN PATENT DOCUMENTS

| | | | | |
|---|---|---|---|---|
| DE | 102019134885 A1 * | 6/2021 | | B60K 35/53 |
| EP | 0937601 A2 * | 8/1999 | | B60K 35/60 |

OTHER PUBLICATIONS

Machine translation of DE102019134885A1 (Year: 2025).*

* cited by examiner

*Primary Examiner* — Jennifer M Anda
(74) *Attorney, Agent, or Firm* — Michael Best & Friedrich LLP

(57) ABSTRACT

A method for operating a wiper (12) of a vehicle (10) having at least one autonomous driving mode is proposed, wherein the autonomous driving mode is based at least on sensor data of at least one sensor (14) of the vehicle (10), wherein the wiper (12) comprises an automated, in particular autonomous, sensor safety mode, in which an uninterrupted and/or fault-free operation of the sensor (14) is ensured with the aid of the wiper (12), and wherein the sensor safety mode is, in particular automatically, activated when the autonomous driving mode of the vehicle (10) is activated.

19 Claims, 3 Drawing Sheets

METHOD FOR OPERATING A WIPER, COMPUTING UNIT AND VEHICLE

BACKGROUND

A wiper for cleaning a vehicle window is already known.

SUMMARY

A method for operating a wiper of a vehicle having at least one autonomous driving mode is proposed, wherein the autonomous driving mode is based at least on sensor data of at least one sensor of the vehicle, wherein the wiper comprises an automated, in particular autonomous, sensor safety mode, in which an uninterrupted and/or fault-free operation of the sensor is ensured with the aid of the wiper, and wherein the sensor safety mode is, in particular automatically, activated when the autonomous driving mode of the vehicle is activated.

Advantageously, a particularly high level of operational reliability can be provided by the configuration of the method for operating the wiper according to the invention, as in particular a sensor safety mode in which an uninterrupted and/or error-free operation of the sensor is ensured is automatically activated. Advantageously, a high level of ease of use can be provided, as in particular the sensor safety mode is automatically activated.

Preferably, the sensor, in particular vehicle sensor, preferably driving assistance sensor, is provided for a vehicle, preferably one which is autonomously and/or semi-autonomously operated. Preferably, the vehicle is configured as a passenger car, a commercial vehicle, a rail vehicle, a ship, an aircraft, a drone, and/or a similarly configured vehicle and/or transportation means. In particular, the sensor is configured as an optical sensor. The sensor could be configured as a camera, for example. However, the sensor could also be configured as a radar sensor or a comparable sensor. Preferably, the sensor comprises at least one sensor field. In particular, the sensor field of the sensor is configured as an optical element. Preferably, the field of view of the sensor is configured as at least one measurement range of the sensor and/or sensor field. In particular, the sensor and/or the sensor field comprises at least one sensor field surface. In particular, the sensor field surface is at least partially, preferably completely, formed by the window, in particular vehicle window. Preferably, the sensor is configured to provide sensor data for vehicle operation, in particular one which is autonomous and/or semi-autonomous. In this context, a "sensor" is to be understood in particular to mean a unit that is provided to record at least one characteristic variable and/or one physical property, wherein the recording can take place actively, such as in particular by generating and transmitting an electrical measurement signal, and/or passively, such as in particular by detecting changes in the properties of a sensor component. Different sensors that appear advantageous to the skilled person are conceivable. A "sensor field" is to be understood in particular to mean an area, in particular a measuring area, in which a measurement is carried out with a sensor. "Sensor data" is to be understood to mean data, in particular raw data, preferably, measurement data of the sensor, which are acquired by the sensor in a sensor operation. The sensor field can be configured by a portion of a sensor housing, a sensor cover or a vehicle window arranged between the sensor and an environment. The terms "provided" or "configured" are in particular intended to mean specifically programmed, designed, and/or equipped. The phrase "an object being provided for a specific function" is particular intended and/or configured to mean that the object fulfills and/or performs this specific function in at least one application and/or operating state.

Preferably, the wiper is configured as a windshield wiper and/or a sensor wiper. The wiper is preferably intended for use on a vehicle, in particular a passenger car and/or truck. The wiper preferably forms a portion of the window wiper. Preferably, the wiper, in particular as a portion of the windshield wiper, is configured to clean a surface, preferably a windshield, for example a vehicle windshield and/or the sensor field surface of the sensor and/or a headlight lens and/or the like, in particular of the vehicle. The wiper is preferably connected to a vehicle, preferably to at least one wiper drive of the vehicle, for cleaning the window, preferably the vehicle window, such as a windshield and/or rear window and/or the sensor field surface. Preferably, the wiper comprises at least one wiper blade, which is swept over the vehicle window and/or sensor field surface during a cleaning operation, in particular if this is integrated in the vehicle window. In particular, the wiper blade comprises at least one wiper lip that contacts the vehicle window and/or the sensor field surface in at least one operating state. The term "operating state" is preferably intended to mean a state in which the wiper is ready for a wiping process and/or a wiping operation and/or is in a wiping operation in which the wiper, in particular the wiper blade, preferably the wiper lip of the wiper blade, sweeps over the vehicle windshield and/or the sensor field surface and, in doing so, preferably makes contact with the vehicle window and/or sensor field surface.

Preferably, the sensor safety mode comprises at least one function, preferably safety function. In particular, the sensor safety mode is configured at least to detect a functional impairment in at least one operating state of the sensor and/or to initiate a function, preferably a safety function, to eliminate the functional impairment of the sensor. Preferably, the sensor, in particular the autonomous operation of the vehicle, can only be operated with the sensor safety mode activated. A "sensor safety mode" is understood in particular to mean at least one function, preferably a safety function, which is configured to prevent and/or eliminate a safety-relevant/function-relevant impairment of the sensor, in particular a sensor function of the sensor.

Furthermore, it is proposed that the sensor safety mode comprises a water shielding function, in particular one which can be activated automatically as required, in which the sensor, in particular a sensor field cover of the sensor, is at least substantially shielded from water by the wiper. Advantageously, a high level of operational safety can be provided, as the safety mode in particular comprises the water shielding function. Preferably, the sensor field cover is configured as the vehicle window. For example, the water shielding function could be activated when precipitation and/or spray water is expected and/or occurs. Alternatively or additionally, the sensor, in particular a sensor field cover of the sensor, could be shielded from environmental factors, for example sun exposure and/or rockfall and/or hail and/or the like. In particular, the sensor, preferably the sensor field cover of the sensor, is shielded from wetting with water, such as precipitation and/or spray water or the like, by arranging the wiper between the water and the sensor, in particular the sensor field cover of the sensor.

Furthermore, it is proposed that a deflecting element of the wiper, in particular a spoiler of the wiper keeps precipitation and/or spray water at least partially away from the sensor, in particular from the sensor field cover, by deflecting the flow. Advantageously, a high level of operational reliability can be provided, as in particular precipitation and/or spray water is kept away from the sensor by the deflection element. Preferably, the wiper, preferably the deflection element of the wiper, is positioned/arranged such that the sensor, preferably the sensor field cover of the sensor, is in a slipstream of the wind of travel. Preferably, the spoiler is at least configured to deflect a fluid flow, preferably air flow, and/or precipitation and/or spray water contained in the air flow. For example, the fluid flow is configured as the wind of travel. It is conceivable that the fluid flow comprises further solid and/or liquid and/or gaseous substances, such as particulate matter and/or exhaust gases, and/or the like. Preferably, the precipitation and/or spray water is kept away from the sensor field cover at a flow rate of in particular 150 km/h, preferably at least 100 km/h and preferably at least 50 km/h. The term "largely" is in particular to be understood to mean at least 50%, preferably at least 75%, and preferably at least 90%. A "wind of travel" is in particular to be understood to mean an airflow direction of the ambient air surrounding the vehicle relative to the vehicle. "Precipitation" is in particular understood to mean meteoric water, which is formed, for example, as rain, snow, hail, mist, frost, or the like. "Spray water" is in particular understood to mean water, preferably in drop form, which originates from an environment, for example from puddles.

Furthermore, it is proposed that water moved along a surface of the vehicle, for example a window of the vehicle which can be cleaned by the wiper, in particular by a wind of travel, is kept away from the sensor, in particular from the sensor field cover, by a surface contact element of the wiper, in particular a wiper lip of the wiper, by deflection. Advantageously, a high level of operational safety can be provided, as the water in particular is redirected and thereby kept away from the sensor, in particular a sensor field surface of the sensor. Preferably, the surface contact element, preferably the wiper lips of the wiper, is pressed against the surface at least to redirect the water moved by the wind of travel, preferably in a fluid-tight manner. Preferably, the water contacting the surface of the vehicle is kept away from the sensor by the surface contact element, preferably the wiper lip of the wiper. Preferably, the surface contact element, preferably the wiper lip, is positioned/arranged between the water to be deflected and the sensor, in particular the sensor field cover of the sensor. Preferably, the water/water drops adhering to the surface are moved over the surface by the wind of travel, preferably depending on the speed of travel of the vehicle, at least substantially in the direction of the wind of travel.

It is also proposed that the sensor safety mode comprises a sensor test function, in particular one which can be activated automatically as required, in which at least a portion of a sensor field of view of the sensor is specifically obscured by at least a portion of the wiper. Advantageously, a high level of maintenance efficiency can be provided, as in particular maintenance is only performed if a faulty operation of the sensor is determined as part of the sensor test function. Advantageously, a high level of operational reliability can be provided, as in particular the sensor test function automatically detects a faulty operation of the sensor. Preferably, the sensor field of view is partially covered by the sensor to check whether an offline message and/or a contamination detection of the sensor field of view is functioning properly. Preferably, the sensor field of view is at least partially obscured by at least a part of the wiper, for example by moving the wiper over the sensor field of view and/or briefly arranging/holding it in the area of the sensor field of view. It is conceivable that the proper functioning of the contamination detection by the sensor is checked every time the wiper sweeps over the sensor field, in particular by default.

It is also proposed that the sensor safety mode comprises a sensor cleaning function, in particular one which can be activated automatically as required, in which the sensor, in particular a window covering the sensor, e.g., a windshield of the vehicle, is cleaned by a wiping movement of the wiper. Advantageously, a high operational safety/safety can be provided, as in particular the sensor cleaning function provides a particularly good view through the window to be cleaned. Advantageously, a high level of comfort can be provided, as in particular a good view through the window and/or an automatic cleaning of the window is provided. In particular, the window is cleaned by moving the wiper lip of the wiper, which preferably contacts the window, over the window. In particular, the wiper is moved over at least a large part of the window to clean it. In particular, to clean the sensor field of view of the sensor, which is formed by the partial area of the window, the wiper, in particular the wiper lip of the wiper, is moved back and forth in a partial area of the window, preferably in a window portion, for example a sector, which covers at least the sensor field of view. Preferably, moving the wiper back and forth is referred to as "zone wiping." It is conceivable that a cleaning program is selected from a plurality of available cleaning programs for cleaning the window and/or the sensor field, particularly depending on a level of soiling of the sensor and/or the window.

It is also proposed that the sensor safety mode is deactivated, in particular automatically, when the autonomous driving mode of the vehicle is deactivated, or an occupant, in particular a driver, of the vehicle is requested to confirm continued operation of the sensor safety mode. Advantageously, a high level of ease of use can be provided, as in particular the sensor safety mode is automatically deactivated when the autonomous driving mode of the vehicle is deactivated. Advantageously, a high level of safety can be provided, as in particular the driver of the vehicle actively assumes continued operation before the sensor safety mode is deactivated.

In addition, it is proposed that the sensor safety mode is automatically deactivated when the wiper is manually activated by an occupant, in particular a driver, of the vehicle. Advantageously, a high level of ease of use can be provided as the safety mode is automatically deactivated, in particular when the wiper is manually activated. In particular, a planned and/or currently performed sensor field cleaning operation is interrupted when the occupant, in particular the driver, of the vehicle manually activates the wiper and/or manually requests a cleaning operation. Preferably, when the wiper is manually activated by the occupant of the vehicle, an autonomous driving mode of the vehicle is deactivated/terminated. However, it is conceivable that the autonomous driving mode is automatically reactivated and/or remains activated after the window has been cleaned by manually activating the wiper.

It is also proposed that the sensor safety mode, when activated outside the autonomous driving mode of the vehicle, for example in a semi-autonomous or manual driving mode of the vehicle, is activated exclusively after a request and/or reconfirmation of an occupant, in particular a driver, of the vehicle. Advantageously, a high level of operational safety and/or a high level of comfort can be provided, as in particular the wiper does not wipe without warning and a vehicle occupant is not startled. It is conceivable that activation of the safety mode is requested when the sensor detects a cleaning requirement.

Furthermore, a computing unit, in particular control and/or regulating unit, is proposed, which is configured to perform the above-described method for operating a wiper. Advantageously, a high level of operational reliability can be provided, as the computing unit in particular has a very low reaction time to perform the method for operating a wiper. Preferably, the computing unit is integrated in a mechatronic wiper drive and/or at least partially forms the mechatronic wiping drive. It is conceivable that the computing unit, in particular internal and/or external control and/or regulating unit, is configured as the controller of the vehicle. The term "computing unit" is understood in particular to mean a unit having an information input, information processing, and an information output. Advantageously, the computing unit comprises at least one processor, a storage, input and output means, further electrical components, an operating program, regulating routines, control routines, and/or calculation routines. The components of the computing unit are preferably arranged on a common board and/or advantageously arranged within a common housing.

In addition, a vehicle is proposed comprising at least one autonomous driving mode having at least one sensor, on whose sensor data the autonomous driving mode is at least partially based, having a wiper and having a computing unit, in particular a control and/or regulating unit, wherein the computing unit is configured to carry out the method for operating a wiper described above. Advantageously, a particularly high level of operational reliability can be provided, as in particular a sensor safety mode in which an uninterrupted and/or error-free operation of the sensor is ensured is automatically activated. Advantageously, a high level of ease of use can be provided, as in particular the sensor safety mode is automatically activated.

The method for operating a wiper according to the invention, the computing unit according to the invention and the vehicle according to the invention are not intended to be limited to the application and embodiment described hereinabove. In particular, for fulfilling a functionality described herein, the method for operating a wiper according to the invention, the computing unit according to the invention and the vehicle according to the invention can comprise a number of individual elements, components, units, and method steps that deviates from a number specified herein. Moreover, regarding the ranges of values indicated in this disclosure, values lying within the limits specified hereinabove are also intended to be considered as disclosed and usable as desired.

BRIEF DESCRIPTION OF THE DRAWINGS

Further advantages follow from the description of the drawings hereinafter. The drawings illustrate an embodiment example of the invention. The drawings, the description, and the claims contain numerous features in combination. A person skilled in the art will appropriately also consider the features individually and combine them into additional advantageous combinations.

Shown are.

DETAILED DESCRIPTION

Figure 1:
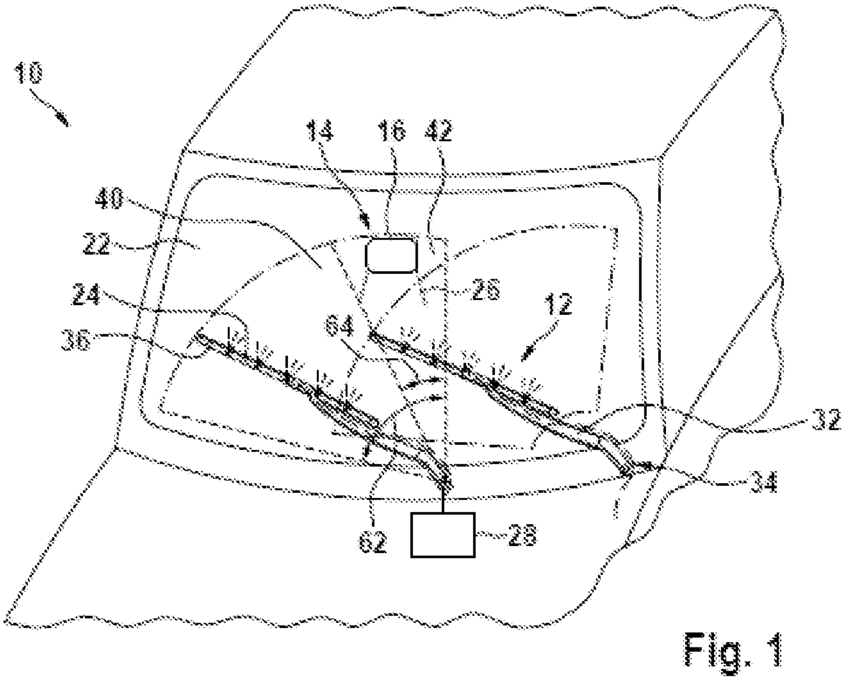
FIG. 1 a vehicle having a wiper and having a sensor.

FIG. 1 shows a vehicle 10. The vehicle 10 is designed as an autonomous or semi-autonomous and/or manually operated vehicle 10. The vehicle 10 has an autonomous and/or semi-autonomous driving mode. The vehicle 10 is designed as a car. The vehicle 10 could also be configured as a truck or ship and/or an aircraft or drone or train or the like. The vehicle 10 includes a window 22. The window 22 is configured as a vehicle window. The window is configured as a windshield/front windshield. The window 22 could also be configured as a rear window or a comparable window 22, for example a sensor window. The vehicle 10 comprises a sensor 14. The sensor 14 is designed as a vehicle sensor. The sensor 14 is arranged in a rear view mirror base. The sensor 14 is arranged in a passenger compartment. The sensor 14 contacts the window 22. The sensor 14 comprises a sensor field cover 16. The sensor field cover 16 is formed by the window 22 of the vehicle 10. The sensor field cover 16 is designed to be transparent. The sensor 14 comprises a sensor field of view 26. The sensor field cover 16 defines the sensor field of view 26. The sensor 14 detects a vehicle environment arranged within the sensor field of view 26. The sensor 14 provides sensor data. The sensor data could be configured as image data of the vehicle environment.

The vehicle 10 includes a wiper 12. The wiper 12 has a safety mode. The safety mode is configured to ensure uninterrupted and/or error-free operation of the sensor 14. The sensor safety mode includes a water shielding function. The sensor safety mode includes a sensor test function. The sensor safety mode includes a sensor cleaning function. The sensor safety mode could include other functions, such as a sensor protection function or the like. The wiper 12 comprises a wiper arm 32. The wiper arm 32 is coupled to a wiper drive 34 of the vehicle 10. The wiper 12 comprises a wiper blade 36. The wiper blade 36 has a wiper lip 24. Preferably, the wiper lip 24 is made of a rubber material. The wiper lip 24 contacts the window 22. The wiper lip 24 is configured to be moved over the window 22 in an operation. The area of the window 22 swept by the wiper lip 24 is configured as a wiping area 40. The wiping area 40 is formed as a circular sector. The circular sector includes a smallest angle 62 of a maximum of 180°. The sensor field cover 16 is arranged within the wiping area 40. The window 22 has a sensor wiping zone 42. The sensor wiping zone 42 is configured as a partial area of the wiping area 40. The sensor wiping zone 42 completely overlaps the sensor field cover 16 of the sensor 14. The sensor wiping zone 42 is configured as another circular sector. The further circular sector of the sensor wiping zone 42 has a further smallest angle 64 which is less than a smallest angle 62 of the circular sector of the wiping area 40. The further circular sector has a further smallest angle 64 of a maximum of 30°. The vehicle 10 comprises a computing unit 28. The computing unit 28 is configured as an internal and/or external control and/or regulating unit. The computing unit 28 is configured to control and/or regulate the autonomous driving mode based on the sensor data of the sensor 14. The computing unit 28 is configured to control and/or regulate the wiper 12. It is conceivable that the control and/or regulating unit 40 is configured as a controller of the vehicle 10.

Figure 2:
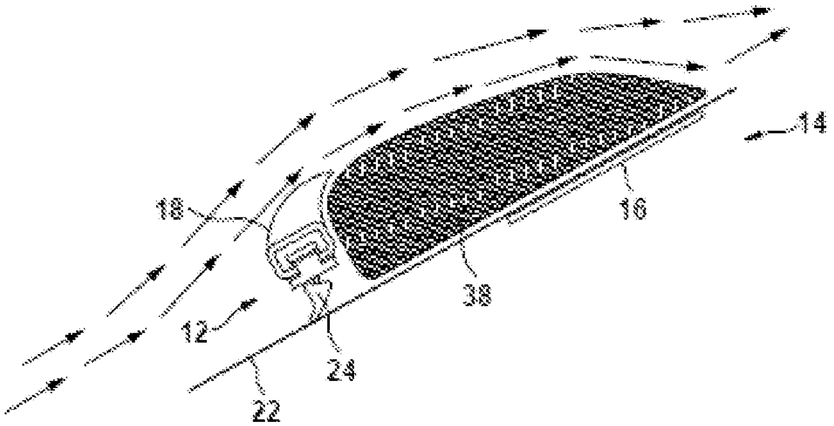
FIG. 2 a schematic cross-sectional view of the wiper with a deflection element, FIG. 3 a schematic representation of the wiper with a surface contact element, FIG. 4 a schematic representation of the wiper with the sensor covered and FIG. 5 a schematic flow diagram of a method according to the invention for operating the wiper.

FIG. 2 shows the window 22 in a schematic cross-sectional view. Furthermore, FIG. 2 shows the wiper 12. The wiper lip 24 of the wiper 12 contacts the window 22. The wiper 12 is configured to shield the sensor field cover 16 of the sensor 14 from water. The wiper 12 comprises a deflection element 18. The deflection element 18 is configured as a spoiler. The deflection element 18 is configured to deflect a fluid flow. The fluid flow is formed by the wind of travel and/or an ambient wind. The deflection element 18 is configured to keep a precipitation and/or spray water away from the sensor field cover 16 by deflecting the flow. The deflection element 18 provides a slipstream 38. The wiper 12 is positioned on the window 22 in an operating state, such that the sensor field cover 16 is arranged in the slipstream 38 of the deflection element 18 of the wiper 12.

Figure 3:
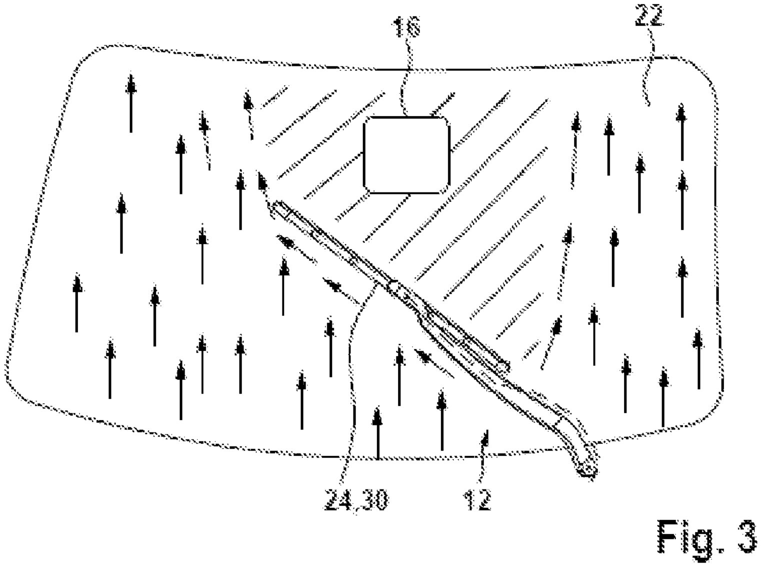

FIG. 3 shows the window 22 in a schematic top plan view. Furthermore, FIG. 2 shows the wiper 12. The wiper 12 comprises a surface contact element 30. The surface contact element 30 of the wiper 12 contacts the window 22. The surface contact element 30 of the wiper 12 pressed onto the window 22 is formed as a fluid-tight contact between the wiper 12 and the window 22. The surface contact element 30 is configured as the wiper lip 24 of the wiper 12. The surface contact element 30 is configured to keep water moved along the window 22 away from the sensor field cover 16 by deflection.

Figure 4:
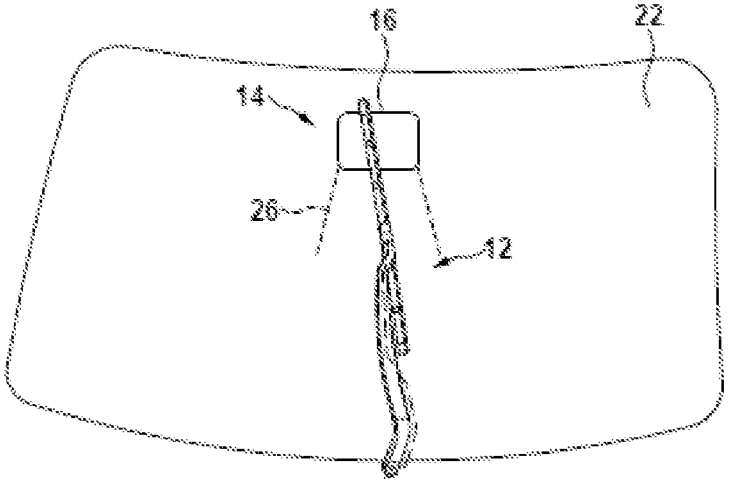

FIG. 4 shows the window 22 in a schematic top plan view. Furthermore, FIG. 2 shows the wiper 12. The wiper 12 is arranged such that a portion of the wiper 12 is arranged on the sensor field cover 16. The wiper 12 completely overlaps the sensor field cover 16 in a longitudinal direction of the wiper 12. The wiper 12 obscures a partial area from the sensor field of view 26. The sensor 14 is configured to detect a partial concealment/covering of the sensor field cover 16. It is conceivable that the wiper 12 completely covers the sensor field cover 16 and/or the sensor field of view 26. The partial concealment/covering of the sensor field cover 16 by the wiper 12 can check whether the sensor 14 detects a contamination/wetting of the sensor field cover 16 without errors.

Figure 5:
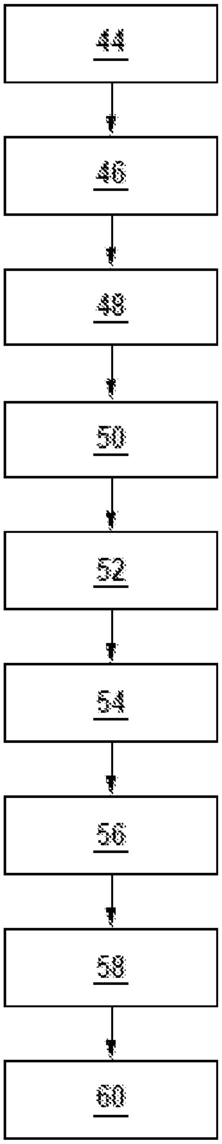

FIG. 5 shows a schematic flow diagram of a method according to the invention for operating the wiper 12.

In a method step 44, an uninterrupted and/or error-free operation of the sensor 14 is ensured with the aid of the wiper 12 by automatically activating the sensor safety mode when the autonomous driving mode of the vehicle 10 is activated. It is conceivable that the sensor safety mode is manually activated by a vehicle occupant. It is conceivable that the sensor safety mode is automatically/or manually activated when a semi-autonomous driving mode of the vehicle 10 is activated.

In a further method step 46, the sensor field cover 16 of the sensor 14 is shielded from precipitation and/or spray water by the wiper 12. The sensor field cover 16 of the sensor 14 is shielded by a water shielding function which can be activated automatically as required. The water shielding function is activated when a soiling/wetting of the sensor field cover 16 is detected by the sensor 14. The water shielding function is activated when there is a high probability of precipitation. The precipitation probability could be provided, for example, by data of a weather service.

In a further method step 48, the precipitation and/or spray water is kept away from the deflection element 18 of the wiper 12 by deflecting the flow away from the sensor field cover 16 of the sensor 14. The deflection element 18 deflects the wind of travel, such that the sensor field cover 16 is protected from the precipitation and/or spray water by the slipstream 38 (see FIG. 2).

In a further method step 50, the water moved along the windshield 22, which can be cleaned by the wiper 12, is kept away from the sensor field cover 16 by the wiper lip 24 of the wiper 12 by deflection (see FIG. 3). It is conceivable that the further method step 48 and the further method step 50 are performed simultaneously.

In a further method step 52, a sensor test function of the sensor safety mode is automatically activated as required. The sensor test function is activated at regular intervals. For example, the sensor test function could be activated after a start of the engine. Alternatively, the sensor test function could be activated each time the wiper 12 is swept over the sensor field cover. In the sensor test function, a portion of the sensor field of view 26 of the sensor 14 is specifically obscured by a portion of the wiper 12. While the portion of the sensor field of view 26 is obscured by the portion of the wiper 12, it is checked whether the sensor 14 detects the covering, which simulates soiling/wetting, without errors (see FIG. 4).

In a further method step 54, a sensor cleaning function of the sensor safety mode is automatically activated as required. For example, the sensor cleaning function is activated when a precipitation is detected by the sensor 14. In the sensor cleaning function, the window 22 covering the sensor 14 is cleaned by a wiping movement of the wiper 12. To this end, the wiper 24 of the wiper 12 is moved over the window 22. The window 22 is cleaned by the water on the window 22 being mechanically wiped off by the wiper lip 24 and/or pushed to one side of the window 22. It is conceivable that the window 22 is cleaned at different cleaning intervals.

In a further method step 56, the sensor safety mode is automatically deactivated when the autonomous driving mode of the vehicle 10 is deactivated. Alternatively, a driver of the vehicle 10 is requested to confirm continued operation of the sensor safety mode.

In a further method step 58, the sensor safety mode is automatically deactivated when the wiper 12 is manually activated by a driver of the vehicle 10. Alternatively, it is conceivable that the driver is requested to wait until a cleaning state of the sensor 14 permits cleaning of the window 22. For example, the driver could be requested to agree to prioritize cleaning the sensor 14 prior to cleaning the window 22.

In a further method step 60, the sensor safety mode is activated outside the autonomous driving mode of the vehicle 10 only after a request and/or reconfirmation by the driver. For example, the safety mode is activated in a semi-autonomous or manual driving mode of the vehicle 10 only when the driver confirms the request for activation.

The invention claimed is:

1. A method for operating a wiper (12) of a vehicle (10) having at least one autonomous driving mode, wherein the autonomous driving mode is based at least on sensor data of at least one sensor (14) of the vehicle (10), wherein the wiper (12) comprises an automated sensor safety mode, in which an uninterrupted and/or fault-free operation of the sensor (14) is ensured with the aid of the wiper (12), and wherein the sensor safety mode is activated when the autonomous driving mode of the vehicle (10) is activated, wherein the sensor safety mode comprises a water shielding function in which the sensor (14) is at least substantially shielded from water by the wiper (12), wherein the method includes activating the water shielding function, such that a deflection element (18) of the wiper (12) continuously keeps precipitation and/or spray water at least partially away from the sensor (14) during the autonomous driving mode, by deflecting a flow of the precipitation and/or spray water, wherein the deflection element is a spoiler of the wiper (12) that keeps the precipitation and/or spray water at least partially away from the sensor (14), wherein the wiper (12) further includes a wiper lip (24) that contacts a window (22) of the vehicle, and wherein during the water shielding function, the spoiler is positioned/arranged such that the sensor remains in a slipstream of a wind of travel, wherein the wind of travel is an airflow direction of ambient air surrounding the vehicle relative to the vehicle.

2. The method according to claim 1, wherein water moved along a surface of the vehicle (10) is kept away from the sensor (14) by a surface contact element (30) of the wiper (12) by deflection.

3. The method according to claim 2, wherein water moved along a surface of a window (22) of the vehicle (10) which can be cleaned by the wiper (12), by a wind of travel, is kept away from the sensor (14).

4. The method according to claim 1, wherein the sensor safety mode comprises a sensor test function in which at least a portion of a sensor field of view (26) of the sensor (14) is specifically obscured by at least a part of the wiper (12).

5. The method according to claim 1, wherein the sensor safety mode comprises a sensor cleaning function in which the sensor (14), is cleaned by a wiping movement of the wiper (12).

6. The method according to claim 1, wherein the sensor safety mode is deactivated when the autonomous driving mode of the vehicle (10) is deactivated, or an occupant of the vehicle (10) requests continued operation of the sensor safety mode.

7. The method according to claim 1, wherein the sensor safety mode is automatically deactivated when the wiper (12) is manually activated by an occupant of the vehicle (10).

8. The method according to claim 7, wherein the sensor safety mode is automatically deactivated when the wiper (12) is manually activated by a driver.

9. The method according to claim 1, wherein the sensor safety mode, when activated outside the autonomous driving mode of the vehicle (10), is activated exclusively after a request and/or reconfirmation of an occupant of the vehicle (10).

10. A computing unit (28) which is configured to perform a method according to claim 1.

11. The computing unit of claim 10, wherein the computing unit is a control unit and/or a regulating unit.

12. A vehicle (10) comprising the at least one autonomous driving mode having the at least one sensor (14), on whose sensor data the autonomous driving mode is at least partially based, having the wiper (12) and having a computing unit (28), wherein the computing unit (28) is configured to carry out the method according to claim 1.

13. The vehicle of claim 12, wherein the sensor (14) is positioned in a rear view mirror base of the vehicle, wherein the vehicle includes a front window, and wherein the wiper (12) includes a wiper lip (24) that contacts the window.

14. The method according to claim 1, wherein the sensor safety mode is an autonomous safety mode.

15. The method according to claim 1, wherein the sensor safety mode is automatically activated when the autonomous driving mode of the vehicle (10) is activated.

16. The method according to claim 1, wherein the water shielding function is one which can be activated automatically.

17. The method according to claim 1, wherein a sensor field cover (16) of the sensor (14) is at least substantially shielded from water by the wiper (12).

18. The method according to claim 17, wherein the spoiler keeps the precipitation and/or spray water at least partially away from the sensor field cover (16).

19. The method of claim 1, further comprising activating a sensor test function in which at least a portion of a sensor field of view (26) of the sensor (14) is specifically obscured by at least a part of the wiper (12), and activating a sensor cleaning function in which the sensor (14) is cleaned by a wiping movement of the wiper (12).

* * * * *